(12) United States Patent
Akhund et al.

(10) Patent No.: US 8,820,565 B2
(45) Date of Patent: Sep. 2, 2014

(54) CLAMP-STYLE CLOSURE

(75) Inventors: Saeed A. Akhund, Cypress, TX (US);
Jarrod S. Robertson, Cypress, TX (US);
Michael J. Chiles, The Woodlands, TX (US);
Barry G. Jansma, Spring, TX (US);
Steven W. Curry, Spring, TX (US);
Mark C. Euwer, Richmond, TX (US)

(73) Assignee: Robbins & Myers Energy Systems L.P., Willis, TX (US)

( * ) Notice: Subject to any disclaimer, the term of this patent is extended or adjusted under 35 U.S.C. 154(b) by 626 days.

(21) Appl. No.: 13/047,278

(22) Filed: Mar. 14, 2011

(65) Prior Publication Data
US 2012/0234834 A1 Sep. 20, 2012

(51) Int. Cl.
*B65D 45/16* (2006.01)

(52) U.S. Cl.
CPC . *A61J 13/10* (2013.01); *A61J 13/20* (2013.01)
USPC ......... 220/321; 220/324; 292/256.65; 49/465

(58) Field of Classification Search
CPC .................................. A61J 13/20; A61J 13/10
USPC ......... 220/315, 324, 326, 327, 328, 319, 320, 220/321; 292/256, 256.6, 256.65, 256.69; 49/395, 465
See application file for complete search history.

(56) References Cited

U.S. PATENT DOCUMENTS

| | | | |
|---|---|---|---|
| 3,077,360 A | 2/1963 | Israel | |
| 4,157,146 A | 6/1979 | Svenson | |
| 4,237,936 A | 12/1980 | Lollis et al. | |
| 4,288,001 A | 9/1981 | Lankston | |
| 4,387,740 A | 6/1983 | Vanzant | |
| 4,466,550 A | 8/1984 | Sullivan | |
| 4,483,458 A | 11/1984 | Minning et al. | |
| 4,589,566 A | 5/1986 | Rives et al. | |
| 4,693,278 A | 9/1987 | Wilson et al. | |
| 5,215,206 A * | 6/1993 | Siblik | 220/320 |
| 5,713,482 A | 2/1998 | Bordner et al. | |
| 6,050,615 A | 4/2000 | Weinhold | |
| 6,439,415 B1 | 8/2002 | Salim et al. | |
| 6,561,556 B2 | 5/2003 | Fuchs | |
| 6,685,380 B2 | 2/2004 | White et al. | |
| 6,742,957 B2 | 6/2004 | Smith et al. | |
| 7,036,674 B2 | 5/2006 | McGuire | |
| 7,243,685 B2 | 7/2007 | White et al. | |

(Continued)

OTHER PUBLICATIONS

International Preliminary Examining Authority (Ipea); International Preliminary Report of Patentability; Jun. 14, 2013.

*Primary Examiner* — Robert J Hicks
*Assistant Examiner* — Kareen Rush
(74) *Attorney, Agent, or Firm* — Streets & Steele; Patrick K. Steele; Jeffrey L. Streets

(57) ABSTRACT

A closure (10) for sealing fluid within a pressure vessel having a hub (70) with an opening therein includes a door (12) and a plurality of clamp ring segments (14) for fitting over an exterior portion of both the closed door and the hub. A plurality of interconnecting members (18) connect ends of adjacent clamp ring segments, and an actuator mechanism (20) moves the plurality of clamp ring segments into and out of engagement with the door.

20 Claims, 5 Drawing Sheets

(56) References Cited

U.S. PATENT DOCUMENTS

| | | |
|---|---|---|
| 7,341,161 B2 | 3/2008 | McGuire |
| 7,883,721 B2 | 2/2011 | McAllister et al. |
| 7,896,187 B2 * | 3/2011 | Haibel ............... 220/319 |
| 8,297,463 B2 * | 10/2012 | McQuaid et al. ............. 220/323 |
| 8,308,011 B2 * | 11/2012 | Mehta et al. ................... 220/320 |
| 8,540,103 B2 * | 9/2013 | Lollis et al. ................... 220/324 |
| 8,596,484 B1 * | 12/2013 | Haibel ............... 220/323 |
| 2009/0145904 A1 | 6/2009 | Guidry, Jr. |

* cited by examiner

CLAMP-STYLE CLOSURE

FIELD OF THE INVENTION

The present invention relates to closures of the type for reliably closing against a hub at the end of a pressurized fluid vessel, such as a storage vessel or a pipeline. More particularly, the present invention relates to a clamp-style closure with radially external clamp segments for clamping together the hub and the door.

BACKGROUND OF THE INVENTION

Various types of closures have been devised over the last few decades. Such closures may generally be classified as threaded closures wherein the threaded closure cap screws onto external threads on a hub to connect the closure to the hub, internal closures wherein the locking member between the hub and the closure locks within an interior of the hub, and clamp-style closures wherein clamp segments clamp together a portion of the hub and a portion of the door to connect the door and the hub. Regardless of the style of the closure, a sealing member is conventionally provided for sealing the door to the hub, so that pressure within the vessel (or a partial vacuum within the vessel) is maintained to keep fluids (liquids or gases) within the pressure vessel and prevent air or other fluids from leaking into the vessel through the closed door.

Each type of closure has features which attract certain segments of the closure market to that type of closure. Different types of closure have different costs, and different connect/disconnect times are required for different closure types to disconnect the door from the hub when the pressure in the vessel is substantially atmospheric pressure. U.S. Pat. Nos. 4,387,740, 4,466,550, 4,693,278, 6,439,415, 7,036,674, 7,341,161, 7,243,685, and Publication U.S. 2009/0145904 A1 discloses various types of closures with locking members internal to the hub. U.S. Pat. No. 4,237,936 discloses a clamp-type closure with left and right side clamp segments connected at an upper and lower portion of the door. Other clamp-type closures are disclosed in U.S. Pat. Nos. 4,288,001 4,483, 458, and 3,077,360. U.S. Pat. Nos. 4,157,146 and 6,561,556 discloses closure clamps which are positioned about the perimeter of the door. U.S. Pat. Nos. 4,589,566, 6,685,380, and 6,742,957 discloses various types of threaded closures. A pipe coupling clamp is disclosed in U.S. Pat. Nos. 6,050,615 and 7,883,721.

The disadvantages of the prior art are overcome by the present invention, an improved clamp-type closure is hereinafter disclosed.

SUMMARY OF THE INVENTION

In one embodiment, a closure is provided for sealing fluid pressure within a vessel having a hub with an opening therein. The closure includes a door for fitting over the opening in the hub, and a plurality of clamp ring segments each fitting about an exterior portion of the closed door and the hub. A plurality of interconnecting members connect ends of adjacent clamp ring segments, and an actuator mechanism rotatable about a central axis of the door moves each of the plurality of clamp ring segments into and out of engagement with the door.

These and further features and advantages of the present invention will become apparent from the following detailed description, wherein reference is made to the figures in the accompanying drawings.

DETAILED DESCRIPTION OF PREFERRED EMBODIMENTS

Figure 1:
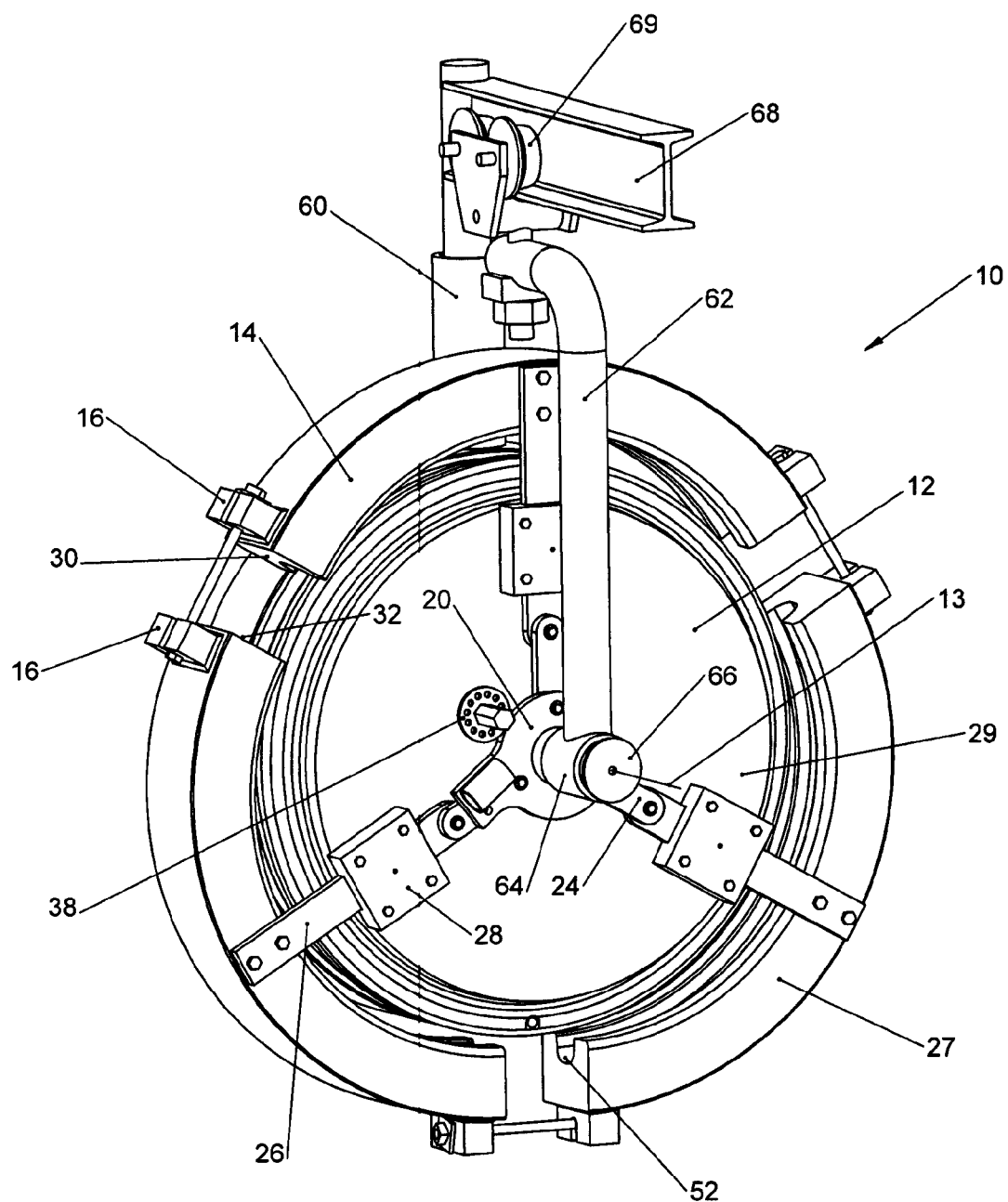
FIG. 1 is a front pictorial view of a suitable closure with clamp ring segments interconnecting the door and the hub.

FIG. 1 illustrates one embodiment of a closure 10 according to the present invention, including a generally circular door 12 having a central axis 13 for positioning over the opening of a hub, as shown more clearly in other figures and as discussed below. A plurality of clamp ring segments 14 are circumferentially positioned for fitting over the outer exterior portion of both the closed door and the hub when the clamp ring segments are in the closed position. FIG. 1 illustrates the clamp ring segments spaced from the door, so that the door can be opened. Clamp ring segments are nevertheless supported on the door and thus move with the door between the open and closed positions. An actuator mechanism 20 is rotatable about the central axis 13 of the door for moving each of the plurality of clamp ring segments into and out of engagement with the door and the hub.

The ends of each clamp ring segment 14 may include a bolt lug 16, so that the planar faces 30 and 32 of the clamp ring segments may be brought into or close to engagement, thereby securely locking the clamp ring segments to both the hub and the door. The closure as shown in FIG. 1 includes three clamp ring segments, which is preferable for many applications since the projecting bolt lugs 16 are not provided at the uppermost portion of the closure, but instead are provided approximately at the ten o'clock, two o'clock, and six o'clock positions, thereby providing more ready access to the operator. By providing three or more clamp ring segments, the weight of each clamp ring segment may be reduced, therefore the segments may be more easily and reliably moved between the open and closed positions.

Figure 2:
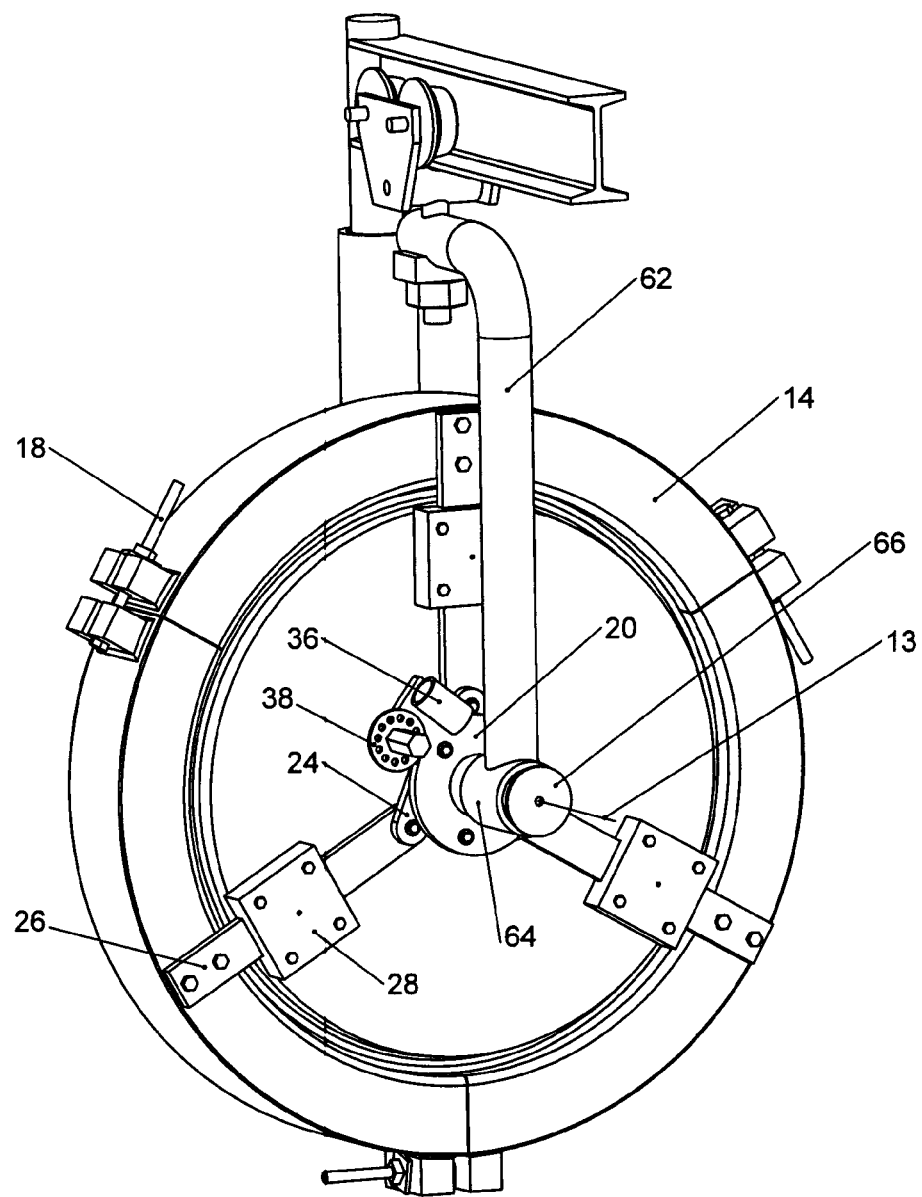
FIG. 2 is a front pictorial view of the closure shown in FIG. 1 wherein the clamp ring segments are moved from the opened to the closed position, thereby locking the door to the hub.

The actuator mechanism 20 as shown in FIG. 1 includes a pivot mechanism which is rotatable to move the plurality of clamp ring segments 14 into and out of engagement with the door. More particularly, the pivot mechanism 20 is rotatably interconnected to each of the three links 24, which are also pivotally connected to radially extending slats or members 26, which are fixedly connected in a conventional manner to a respective one of the clamp ring segments 14. A guide block 28 is supported on the door and guides movement of each radially extending member 26 so that movement of the members 26 is in a substantially radial direction. As shown in FIGS. 1 and 2, the outer face 27 of each clamp ring segment is substantially parallel to an outer face 29 of the door, so that each radially extending member 26 may slide along the outer surface 29 and remain fixed to the respective clamp ring segment as the clamp ring segments are moved between the open and the closed positions.

FIG. 1 also illustrates a suitable mechanism for supporting the door as it is moved into and out of engagement with the hub. More particularly, a hinge socket 60 is supported on the hub and supports rail segment 68. Hinge arm 62 is supported by rail rollers 69, and is pivotal with respect to the hub. The hinge arm 62 in turn supports sleeve 64, which fits over stub shaft 66 fixed to the door and having a central axis substantially aligned with a central axis of the door. The mechanism as shown in FIGS. 1 and 2 is ambidextrous, meaning that the door may be swung to the right or to the left once disconnected from the hub, and thereafter may be moved to a location spaced from the hub by sliding the door 12, the clamp ring segments 14, and the hinge arm 62 along the rail 68.

FIG. 2 shows the closure as shown in FIG. 1 with the door and the clamp ring segments 14 in the closed position, such that the clamp ring segments fixedly interconnect the door to the hub. Pressure alert plug 38 as shown in FIG. 1 extends outwardly to prevent rotation of the actuator mechanism 20. Sleeve 36 is supported on the actuator mechanism 20, and is sized to receive a suitable bar to apply torque to the actuator mechanism 20, thereby moving the link arms 24 and the radially extending members 26 from the clamp ring segment open or unlocked position as shown in FIG. 1 to the clamp ring segment locked or closed position as shown in FIG. 2. The pressure plug 38 physically prevents opening of the closure when the vessel is under pressure. Plug 38 also provides an audible or visual alarm to the operator if pressure is in the vessel. If no pressure exists in the vessel, plug 38 may be unthreaded from the door, which allows rotation of sleeve 36 and unlocking of the door. When pressure in the vessel is reduced to atmospheric pressure, plug 38 may be removed from the door to allow the sleeve 36 to be rotated, thereby opening the clamp ring segments 14. Removal of plug 38 will warn the operator of any residual pressure in the vessel before the closure clamps are opened.

Figure 3:
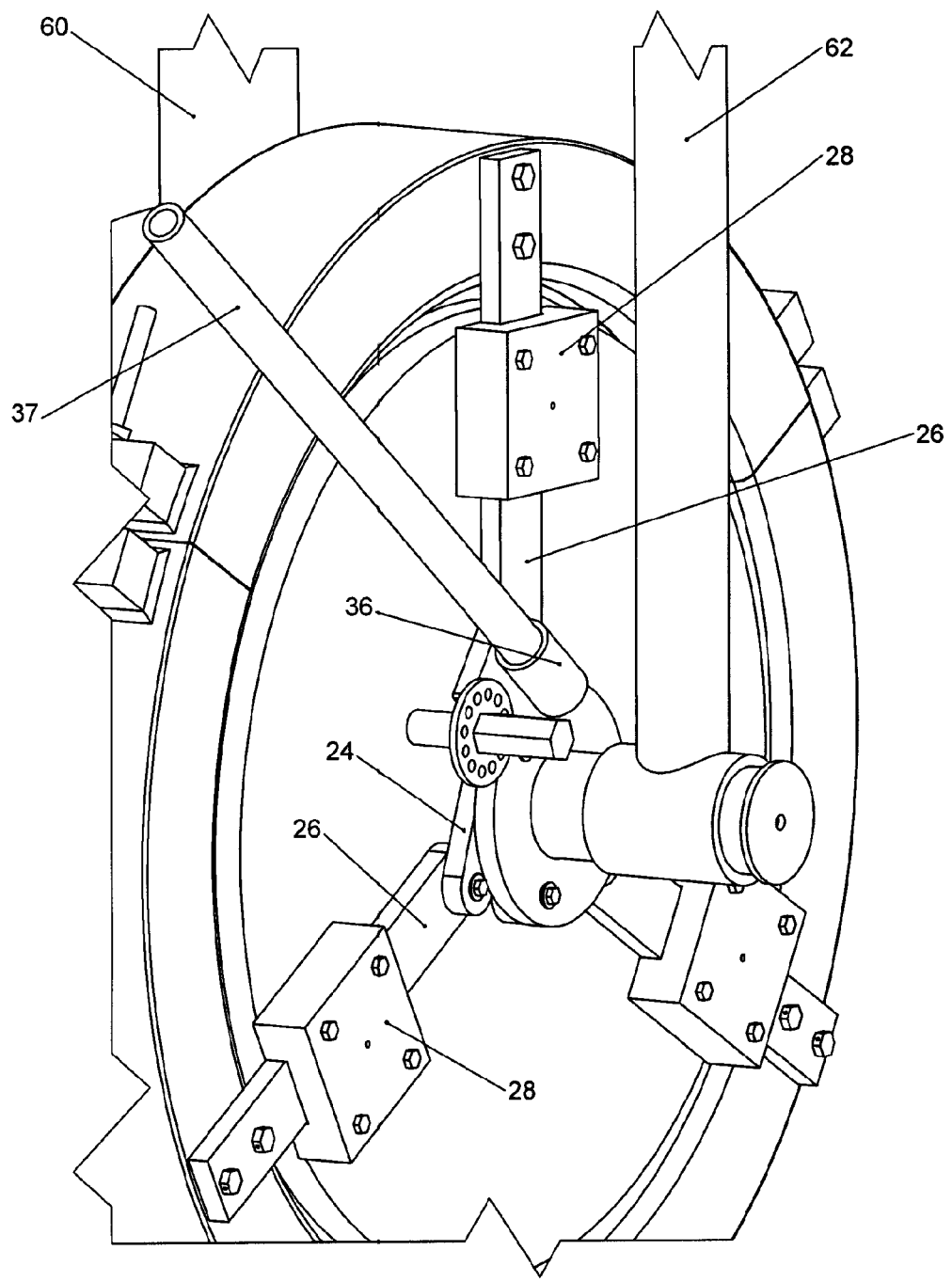
FIG. 3 is a detailed view of a portion of the door shown in FIG. 1, illustrating further details with respect to the actuation mechanism.

FIG. 3 discloses in more detail the actuating mechanism used to move the clamp ring segments from the closed position as shown in FIG. 2 to the open position as shown in FIG. 1. More particularly, moving the clamp ring segments to the open position is achieved by disconnecting the bolts or other securing members 18 as shown in FIG. 2, and using torque bar 37 as shown in FIG. 3 to rotate the sleeve 36 to effectively cause each link arm 24, which is angled with respect to a respective radially extending member 26 as shown in FIG. 3, to the position as shown in FIG. 1, wherein each link arm 24 is substantially aligned with the radially extending member 26, thus moving a respective clamp ring segment radially outward and disconnecting the door from the hub.

Figure 4:
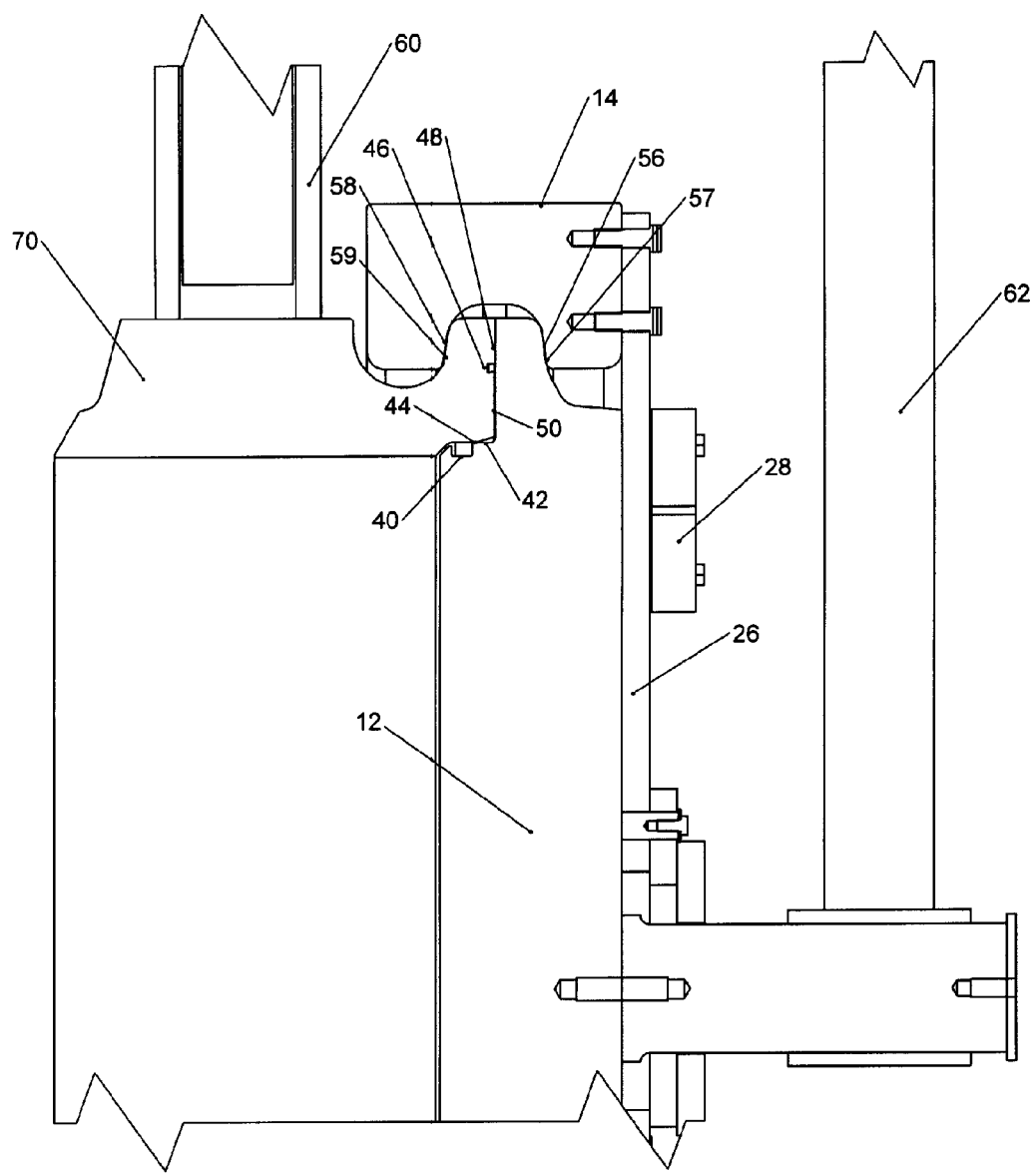
FIG. 4 is a cross-sectional view illustrating a clamp ring segment interconnecting the door and the hub.

FIG. 4 illustrates a cross-sectional view of a suitable clamp ring segment 14 connected to a respective radially extending member 26 which passes through a guide block 28 fixed to the door 12. The hub 70 is shown with the hinge socket 60 secured to and extending upwardly from the hub. The hub 70 conventionally is secured to a flange or directly to a pressure vessel by welding.

The design as shown in FIG. 4 may provide a substantially fire-proof closure due to the inclusion of both first and secondary seal rings. A primary seal ring 40 is provided for sealing between an axially inner face 42 of the hub and an axially outer face 44 of the door, while a secondary seal 46 is provided for sealing between a radially outer face 48 of the hub and a radially inner face 50 of the door. Seal 40 is typically an elastomeric seal, while seal 46 is a non-elastomeric seal formed from a higher temperature resistant material, such as metal, a graphite material, or a composite material. The seal 40 is spaced fairly close to the fluid within the vessel, and in the event of a fire may be destroyed, while the seal 46 is spaced further from the interior of the vessel, and is positioned so that heat may be more quickly dissipated than if positioned closely adjacent the first seal 40, and accordingly can withstand a longer period of high temperature within the vessel in the event of a fire. For this fireproof closure design, mating surfaces 56, 57, 58, and 59 are beveled to squeeze the secondary seal 46 during assembly. A groove 52 in the segment 14, which is also shown in FIG. 1, is thus an annular groove formed by the interconnected segments 14 and securely retains the door on the hub and the seals 40 and 46 in place for reliable sealing engagement.

A standard rather than a fireproof closure may be similar to the FIG. 4 embodiment, although the secondary seal 46 may be eliminated. For this standard closure embodiment, the mating surfaces 56, 57, 58, and 59 may be parallel rather than beveled since there is no secondary seal to squeeze.

Figure 5:
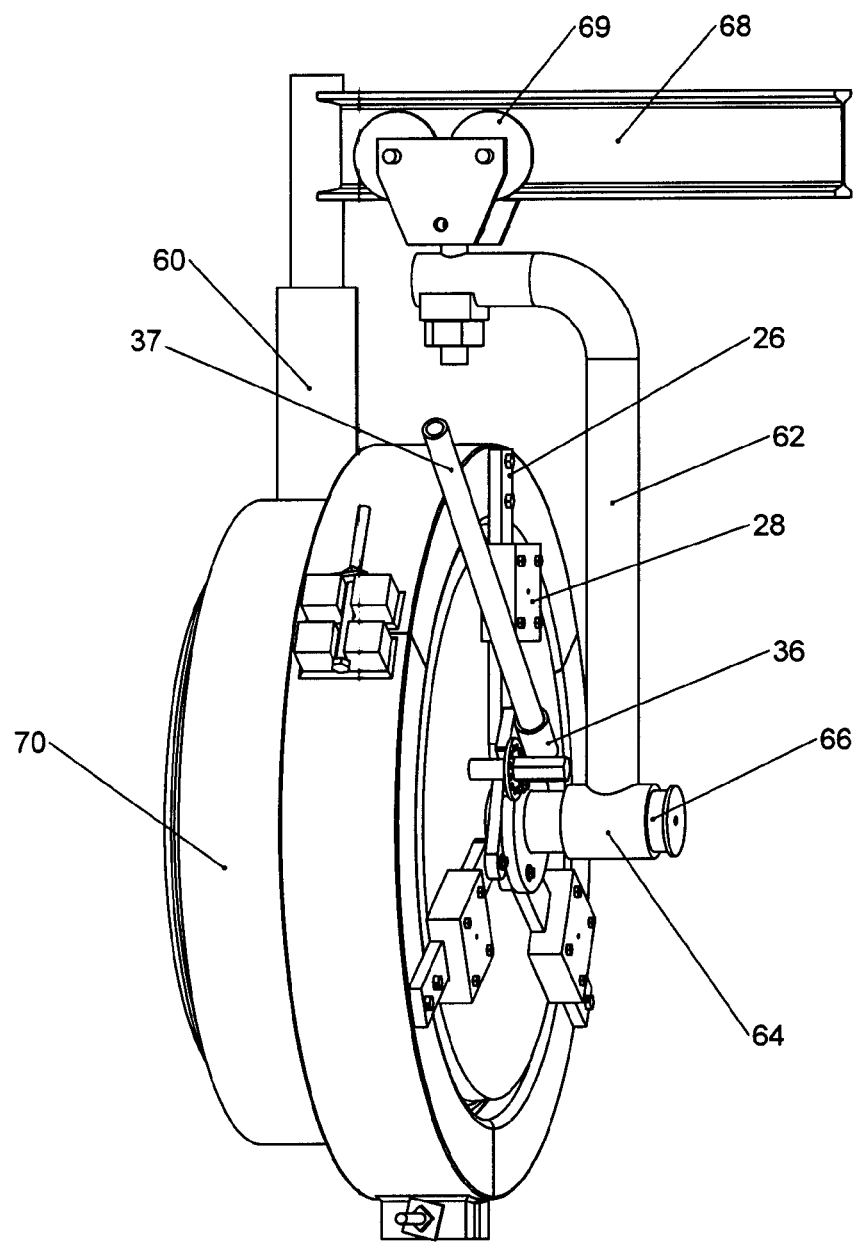
FIG. 5 is a side view of the hub and the door shown in FIG. 1.

FIG. 5 illustrates a closure as disclosed herein and a suitable hub. The hub 70 is thus a generally circular component which is affixed in a conventional manner to the vessel which contains fluid pressure. The closed or substantially closed bolt lugs 16 thus bring the planar faces of the circumferentially spaced clamp rings into or very close to planar engagement.

The closure door as disclosed herein has a generally circular configuration, which is common for door closures. Some closure doors may have an oblong or generally rectangular configuration, and the actuating mechanism disclosed herein may be used for securing such a door to the hub with a plurality of clamp ring segments.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A closure for sealing fluid within a pressure vessel having a hub with an opening therein, the closure comprising:
    a door for fitting over the opening in the hub and having a central axis;
    a plurality of curved circumferentially-spaced clamp ring segments, each clamp ring segment having a groove therein extending along an interior of the curved clamp ring segment, each clamp ring segment being radially inwardly movable relative to the central axis of the door from a door open position, with the groove of each clamp ring segment disengaged from the door and the hub, to a door closed position for fitting the groove of each clamp ring segment over an outer exterior portion of both the door and the hub;
    a plurality of interconnecting members for connecting circumferential ends of adjacent each clamp ring segment; and
    an actuator mechanism rotatable about the central axis of the door for radially inwardly moving each of the plurality of clamp ring segments from the door open position to the door closed position to dispose the outer exterior portions of both the door and the hub within the groove of each of the plurality of clamp ring segments.

2. The closure of claim 1, wherein the actuator mechanism includes a pivot mechanism rotatable to move the plurality of clamp ring segments to receive the outer exterior portions of both the door and the hub within the groove of each of the plurality of each clamp ring segment.

3. The closure of claim 1, further comprising:
the actuator mechanism including a plurality of radially extending members each interconnected to a respective one of the plurality of clamp ring segments; and
a guide block mounted to the door for guiding movement of each of the radially extending members while moving the plurality of clamp ring segments to the door closed position.

4. The closure of claim 1, further comprising:
a first seal sealing between an axially inner face of the hub and an axially outer face of the door; and
a second seal sealing, between a radially outer face of the hub and a radially inner face of the door.

5. The closure of claim 1, wherein the plurality of clamp ring segments are supported on the door and move with the door.

6. The closure of claim 1, wherein three or more clamp ring segments are circumferentially-spaced about the central axis of the door, each of the plurality of clamp ring segments securing a radially exterior portion of the door proximal to a radially exterior portion of the hub.

7. The closure of claim 1, wherein the plurality of interconnecting members includes two or more bolts each for connecting adjacent ends of adjacent clamp ring segments.

8. The closure of claim 1, wherein an outer face of each of the plurality of clamp ring segments in the door closed position is substantially parallel to an outer face of the door.

9. The closure of claim 1, wherein the actuator mechanism includes a sleeve for receiving a torque member to rotate the actuator mechanism about the central axis of the door.

10. The closure of claim 1, further comprising:
a pressure plug removably connected to the door to prevent the actuator member from moving the plurality of clamp ring segments from the door closed position to the door open position when the pressure vessel is pressurized, and removable from the door to allow the actuator member to move the plurality of clamp ring segments to the door open position when the pressure in the pressure vessel is substantially at atmospheric pressure.

11. A closure for sealing fluid within a pressure vessel having a hub with an opening therein, the closure comprising:
a door for fitting over the opening in the hub and having a central axis,
a plurality of curved circumferentially-spaced clamp ring segments supported on the door, each clamp ring segment having a groove therein extending along an interior of the curved each clamp ring segment and each clamp ring segment being radially inwardly movable relative to the central axis of the door from a door open position, with the groove of each clamp ring segment disengaged from the door and the hub, to a door closed position in which the groove of each of the plurality of clamp segments is fitted over radially outer exterior portions of both the door and the hub:
a plurality of interconnecting members for connecting circumferential ends of adjacent each clamp ring segment in the door closed position; and
an actuator mechanism rotatable about the central axis of the door for radially inwardly moving each of the plurality of clamp ring segments from the door open position to the door closed position to dispose the outer exterior portions of both of the door and the hub within the groove of each of the plurality the actuator mechanism including a plurality of radially extending members each coupled to a respective one of the plurality of clamp ring segments.

12. The closure of claim 11, further comprising:
the actuator mechanism includes a pivot mechanism rotatable to move the plurality of each clamp ring segment to receive with the outer exterior portions of both of the door and the hub within the groove of each of the plurality of clamp ring segments; and
a guide block mounted to the door for guiding movement of each of the radially extending members while moving the plurality of clamp ring segments to the door closed position.

13. The closure claim 11, further comprising:
a first seal sealing between an axially inner face of the hub and an axially outer face of the door; and
a second seal sealing between a radially outer face of the hub and a radially inner face of the door.

14. The closure of claim 11, wherein three or more clamp ring segments are circumferentially-spaced about the radially exterior portion of the door, each of the plurality of clamp ring segments securing a radially exterior portion of the door proximal to a radially exterior portion of the hub.

15. The closure of claim 11, wherein an outer face of each of the plurality of clamp ring segments in the door closed position is substantially parallel to an outer face of the door.

16. The closure of claim 11, wherein the actuator mechanism includes a sleeve for receiving a torque member to rotate the actuator mechanism about the central axis of the door.

17. A closure for sealing fluid within a pressure vessel having a hub with an opening therein, the closure comprising:
a door for fitting over the opening in the hub and having a central axis;
a plurality of curved circumferentially-spaced clamp ring segments supported on the door, each clamp ring segment having a groove extending along an interior of the each clamp ring segment, and each radially inwardly movable relative to the central axis of the door from a door open position, with the move of each clamp ring segment disengaged from the door and the hub, to a door closed position for fitting an outer exterior portion of both the door and the hub within he groove of each of the plurality of clamp ring segments:
a plurality of interconnecting members for connecting circumferential ends of adjacent each clamp ring segments; and
an actuator mechanism rotatable about the central axis of the door for radially inwardly moving each of the plurality of clamp ring segments from the door open position to the door closed position to dispose outer exterior portions of both the door and the hub within the groove of each of the plurality of clamp ring segments, the actuator mechanism including a pivot mechanism rotatable to inwardly move the plurality of clamp ring segments into engagement with both the closed door and the hub.

18. The closure of claim 17, further comprising:
the actuator mechanism including a plurality of radially extending members each coupled to a respective one of the plurality of clamp ring segments; and
a guide block mounted to the door for guiding movement of each of the radially extending members while moving the plurality of clamp ring segments to the door closed position.

19. The closure of claim 17, further comprising:
a first seal sealing between an axially inner face of the hub and an axially outer face of the door; and a second seal sealing between a radially outer face of the hub and a radially inner face of the door.

20. The closure of claim 17, wherein an outer face of each of the plurality of clamp ring segments is substantially parallel to an outer face of the closed door; and
the actuator mechanism includes a sleeve for receiving a torque member to rotate the actuator mechanism about the central axis of the door.

* * * * *